Patented May 8, 1951

2,551,887

UNITED STATES PATENT OFFICE 2,551,887

METALLIZABLE MONOAZO DYESTUFFS

Werner Kuster, Basel, Switzerland, assignor to J. R. Geigy A. G., Basel, Switzerland, a Swiss firm No Drawing. Application December 11, 1947, Serial No. 791,169. In Switzerland December 20, 1946

5 Claims. (Cl. 260—199)

This invention relates to the manufacture of valuable new metal-complex forming dyestuffs.

Such dyestuffs are obtained according to the invention when diazotised amines having the general formula

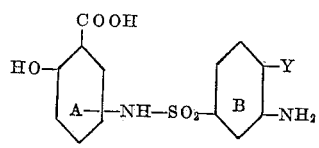

wherein Y means the sulphonic acid group, an arylsulphonyl radical of the benzene series or a lower alkylsulphonyl radical and wherein the nucleus A can contain further simple substituents, usual in azo dyestuffs, are coupled in an acid medium with amino-hydroxynaphthalene-sulphonic acids having the general formula

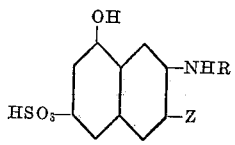

wherein

R means hydrogen, an alkyl or aryl radical and Z means hydrogen or the sulphonic acid group.

The new dyestuffs are far superior in light-fastness to the known similar dyestuffs which contain neither a sulphonic acid group nor an aryl or alkylsulphonyl radical (substituent Y) in nucleus B in o-position with respect to the zero group. Another distinctive feature as compared with similar known dyestuffs sulphonated in the A nucleus and not containing the above defined substituent Y in the o-position to the azo group lies in the valuable bluish tints produced by the new dyestuffs. Furthermore, as compared with similar known dyestuffs manufactured from diazo components free from sulphonic acid groups and without a substituent Y, together with similar coupling components, the dyestuffs of the invention have, in addition to better light-fastness, the property of giving much more uniform prints in chrome-printing on cotton.

The amino-compounds defined in Formula I can be prepared as follows, for example:

4-chloro-3-nitrobenzene-sulphonic chloride is condensed with aminosalicyclic acids in an aqueous medium at 60–70° C. in the presence of acid-binding media such as sodium carbonate or acetate. Suitable aminosalicylic acids are 3-amino-2-hydroxy-benzoic acid, 5-amino-2-hydroxy-benzoic acid, the reduction product of the commercial mixture of 3- and 5-nitro-2-hydroxy-benzoic acids, 5-amino-3-methyl-2-hydroxy-benzoic acid, 5-methyl-3-amino-2-hydroxy-benzoic acid, 5-chloro-3-amino-2-hydroxy-benzoic acid, 5-amino-3-sulpho-2-hydroxy-benzoic acid, 5-sulpho-3-amino-2-hydroxy-benzoic acid and the like. For the production of the compounds defined in Formula I in which Y means a sulphonic acid group, aqueous solutions of the 4-chloro-3-nitrobenzene-sulphamido-salicyclic acid compounds are treated with sodium sulphite at 100° C., whereby the sulphonic acid group replaces the chlorine atom. Next the nitro group is reduced, e. g., with iron and hydrochloric acid. Those compounds of Formula I where Y means an $SO_2$—aryl group or $SO_2$—alkyl group can be made by heating the corresponding 4-chloro-3-nitrobenzene-sulphamido-salicyclic acid compound in aqueous solution with aryl or alkyl sulphinates, e. g. sodium benzene sulphinate, potassium p-toluene-sulphinate or p-chlorobenzene-sulphinate, sodium methyl-sulphinate, sodium ethyl-sulphinate, sodium propyl-sulphinate, sodium butyl-sulphinate and the like. The chlorine atom is replaced in the course of the reaction by an aryl or alkyl sulphonyl group, and the nitro group is then reduced, e .g., with iron and hydrochloric acid.

The new dyestuffs are particularly suitable for chrome-printing on cotton. They dissolve well in water and give printing-pastes which keep well. They can be readily fixed on cotton by a short steaming and give bright, bluish red to reddish violet dyeings which are very fast to light and have good fastness properties when wet. They also dye animal fibres in the acid bath giving pure bluish red to reddish violet shades which are little affected by after-chroming.

In the following examples the invention is further illustrated but not limited thereto by describing the preparation of a few of the new dyestuffs. Parts are by weight and the temperatures are in degrees centigrade.

Example 1

40.2 parts of 2-aminobenzene-1-sulphonic acid -4- sulphonic acid phenylamide-3'-methyl-4'-hydroxy-5'-carboxylic acid are brought into neutral solution in 250 parts of water and together with 6.9 parts of nitrite in 100 parts of water are added dropwise, while cooling, to 30 parts of concentrated hydrochloric acid and 30 parts of water. The temperature should not rise above 3°. The greater part of the yellowish-brown diazo compound is precipitated. To the suspension obtained, which should be distinctly acid to Congo red and should contain no excess nitrous acid is added dropwise a solution of 23.9 parts of 2-amino-8-hydroxynaphthalene-6-sulphonic acid in 100 parts of water. The latter solution should be weakly acid to litmus and is added during the course of an hour. Coupling takes place rapidly and is practically complete in 2.3 hours. Any mineral acid still present is neutralised by the addition of a little sodium acetate solution. The mixture is stirred overnight without further cooling, next it is warmed, neutralised at 80° with about 110 parts of 15% sodium carbonate solution and 20% of common salt is added. The dyestuff is filtered off at 30–40° and washed with approximately 20% brine. After drying, the dyestuff which corresponds to the formula

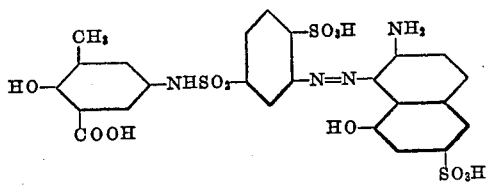

is a blue-red powder which dissolves readily in water to give a blue-red solution and in concentrated sulphuric acid to give a yellow-red one. Chrome-printing on cotton produces a bright bluish red shade, while the acid bath dyeing of wool also yields a bluish red which hardly changes on after-chroming.

Similar dyestuffs are obtained if the 2-aminobenzene-1-sulphonic acid - 4 - sulphonic acid phenylamide - 3' - methyl - 4' - hydroxy - 5'-carboxylic acid is replaced by 38.8 parts of 2-aminobenzene-1-sulphonic acid - 4 - sulphonic acid phenylamide - 4' - hydroxy-5'-carboxylic acid or -2'-hydroxy-3'-carboxylic acid or by 38.8 parts of a mixture of these two compounds, or alternatively by 40.2 parts of 2-aminobenzene-1-sulphonic acid-4-sulphonic acid phenylamide-5'-methyl-2'-hydroxy-3'-carboxylic acid. In place place of 23.9 parts of 2-amino-8-hydroxy-naphthalene-6-sulphonic acid may be used 25.3 parts of 2-methylamino-, 31.5 parts of 2-phenylamino- or 34.3 parts of 2-(2';4'-dimethylphenylamino)-8-hydroxynaphthalene - 6 - sulphonic acid. In each case somewhat more bluish dyestuffs are produced.

The dyestuff obtained from 2-aminobenzene-1-sulphonic acid-4-sulphonic acid phenylamide-4'-hydroxy-5'-carboxylic acid and 2-amino-8-hydroxynaphthalene - 6 - sulphonic acid corresponds to the formula

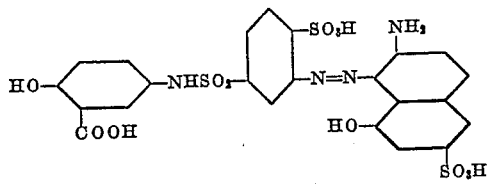

while that obtained from 2-aminobenzene-1-sulphonic acid-4-sulphonic acid phenylamide-2'-hydroxy-3'-carboxylic acid and 2-amino-8-hydroxy-naphthalene-6-sulphonic acid corresponds to the formula

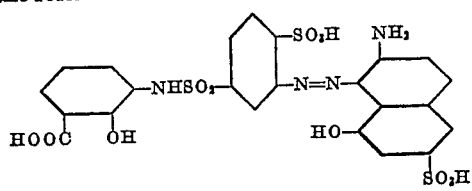

Example 2

52.8 parts of 2-aminobenzene-2-phenylsulphonyl-4-sulphonic acid phenylamide - 3' - carboxylic acid-4'-hydroxy-5'-sulphonic acid are dissolved to give a neutral solution in 300 parts of water. After adding 6.9 parts of sodium nitrite in 100 parts of water, the mixture is added dropwise to 40 parts of concentrated hydrochloric acid and 40 parts of water, the temperature being maintained at 0–3°. The greater part of the yellowish brown diazonium compound separates out. To the suspension of the diazonium compound, which should react distinctly acid to Congo red and in which nitrite should no longer be detectable, is added at 0–5° a solution (weakly acid to litmus) of 23.9 parts of 2-amino-8-hydroxynaphthalene-6-sulphonic acid in 100 parts of water. The addition should take about an hour. Coupling begins as soon as the first drops of this solution are added and is practically complete after 2–3 hours. The reaction mixture is then made neutral to Congo red by the addition of a little sodium acetate solution and left overnight, whereby its temperature is allowed to rise slowly to 20°. After heating to 80°, the reaction mixture is then neutralized with about 150 parts of 15% sodium carbonate solution, 10% of common salt is added, the dyestuff filtered off at 30–40° and washed with 20% brine. After drying at 80°, the dyestuff which corresponds to the formula

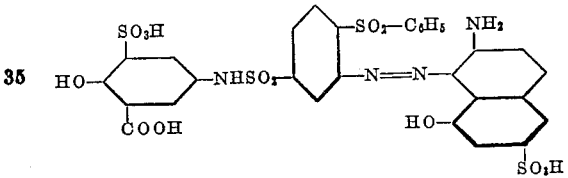

is obtained as a dark, blue-red powder, dissolving in water to give a strong bluish red and in concentrated sulphuric acid to give a brown-red colour. The dyestuff dyes chrome-printed cotton to give a bluish red shade. The acid-bath dyeing produced on wool is also bluish red and hardly changes in shade on after-chroming.

Similar dyestuffs are obtained on replacing the diazo component mentioned above by 54.2 parts of 2-aminobenzene-1-(4'-tolylsulphonyl)-4-sulphonic acid phenylamide-3''-carboxylic acid-4''-hydroxy-5''-sulphonic acid, 44.8 parts of 2-aminobenzene-1 - phenylsulphonyl - 4 - sulphonic acid phenylamide-4'-hydroxy-5'-carboxylic acid or 58.4 parts of 2-aminobenzene-1-(4'-tert. butylphenylsulphonyl) - 4 - sulphonic acid - phenylamide-3''-carboxylic acid-4''-hydroxy-5''-sulphonic acid or by replacing the coupling component by 25.3 parts of 2-methylamino-8-hydroxy-naphthalene-6-sulphonic acid.

Example 3

38.8 parts of 2 - aminobenzene - 1 - sulphonic acid-4 - sulphonic acid - phenylamide - 4' - hydroxy-5'-carboxylic acid are brought into neutral solution in 250 parts of water, mixed with 6.9 parts of sodium nitrite in 100 parts of water and added dropwise to 30 parts of concentrated hydrochloric acid and 40 parts water, whereby the temperature must not exceed 5°. The greater part of the yellowish brown diazonium compound is precipitated. To the suspension, which should react distinctly acid to Congo red and which should contain no excess nitrous acid is added dropwise over the course of an hour a solution weakly acid to litmus, of 31.9 parts of 2-amino-8-hydroxynaphthalene-3:6-disulphonic acid in 100 parts of water. Coupling is complete in about 3 hours. Any mineral acid still present is neutralised by the addition of a little sodium acetate. Stirring is continued overnight and the reaction mixture is heated to 80° and then neutralised with 120 parts of 15% sodium carbonate solution and 20% common salt added. It is then allowed to cool slowly to room temperature, the dyestuff is filteerd off and washed with 200 parts of 20% brine. After drying, the dyestuff is a brown-red powder, dissolving readily in water and in conc. sulphuric acid to give bluish red solutions. It dyes chrome-printed cotton in a bluish red shade. The acid bath dyeing produced on wool is also bluish red and hardly changes in shade on after-chroming.

Similar dyestuffs are obtained on replacing the diazo component mentioned above by 42.3 parts of 2-aminobenzene-1-sulphonic acid-4-sulphonic acid phenylamide-5'-chloro-2'-hydroxy-3'-carboxylic acid or 40.2 parts of 2-aminobenzene-1-sulphonic acid-4-sulphonic acid phenylamide-3'-methyl-4'-hydroxy-5'-carboxylic acid or 56.3 parts of 2-aminobenzene-1-(4'-chlorophenylsulphonyl)-4-sulphonic acid-phenylamide-3''-carboxylic acid-4''-hydroxy-5''-sulphonic acid or by replacing the 2-amino-8-hydroxynaphthalene-3:6-disulphonic acid by 36.2 parts of 2-ω-aminoethylamino - 8 - hydroxynaphthalene - 3:6 - disulphonic acid or by 36.3 parts of 2-β-hydroxyethylamino - 8 - hydroxynaphthalene - 6 - sulphonic acid.

*Example 4*

40.2 parts of 2-aminobenzene-1-sulphonic acid-4-sulphonic acid phenylamide-5'-methyl-2'hydroxy-3'-carboxylic acid are dissolved in 250 parts of water so as to give a neutral solution and mixed with 6.9 parts of sodium nitrite in 100 parts of water. The mixture is added dropwise to 70 parts of 12% hydrochloric acid at a temperature of 0–3°. The diazonium compound which separates almost completely, is light-brown in colour. To this suspension, which should be acid to Congo red and should contain no excess nitrous acid, is added during about ½ hour a suspension (weakly acid to litmus) of 28.2 parts of 2-ω-aminoethylamino-8-hydroxynaphthalene-6-sulphonic acid in 150 parts of water. Coupling sets in slowly and is practically concluded in 4 hours by the addition of about 70 parts of 40% sodium acetate. After stirring overnight the reaction mixture is neutralised with 120 parts of 15% sodium carbonate solution, 20% of common salt is added at 80°, the mixture is cooled to 10°, the dyestuff filtered off and washed with 20% brine. After drying it is a dark blue-red powder dissolving to give a blue-red colour in water and a bluish-red one in concentrated sulphuric acid. It dyes chrome-printed cotton in bright bluish red tones. Acid-bath dyed wool is also a bright blue-red colour. This shade hardly changes on after-chroming.

Similar dyestuffs are obtained on replacing the diazo-component mentioned above by 42.3 parts of 2-aminobenzene-1-sulphonic acid-4-sulphonic acid - phenylamide - 5' - chloro - 2' - hydroxy - 3'-carboxylic acid or 38.8 parts of 2-aminobenzene-1-sulphonic acid-4-sulphonic acid phenylamide-4'-hydroxy-5'-carboxylic acid or by replacing the coupling component by 25.3 parts of 2-methylamino- or 26.7 parts of 2-ethylamino-8-hydroxynaphthalene-6-sulphonic acid or if the dyestuffs from 2-ω-aminoethylamino-8-hydroxynaphthalene-6-sulphonic acid is acetylated in aqueous solution with acetic anhydride.

*Example 5*

To 54.2 parts of 2-aminobenzene-1-(4'-tolylsulphonyl)-4-sulphonic acid - phenylamide-3''-carboxylic acid-4''-hydroxy-5''-sulphonic acid in neutral aqueous solution in 400 parts of water are added 6.9 parts of sodium nitrite. The mixture is added dropwise to 40 parts of concentrated hydrochloric acid and 40 parts of water, whereby the temperature must be 0–3°. The major portion of the yellow-brown diazonium compound separates out. To the suspension, which should be acid to Congo red and should contain no excess nitrous acid, is added during about 1 hour at 0–5° a solution, weakly acid to litmus of 31.5 parts of 2-phenylamino-8-hydroxynaphthalene-6-sulphonic acid. Coupling is near completion in about 4 hours. A neutral reaction to Congo-red is brought about by adding a little sodium acetate, and stirring of the reaction mixture is continued overnight. It is then neutralised with 150 parts of 15% sodium carbonate solution, 10% of common salt added at 80° and the dyestuff filtered off at 30°. After drying at 80° it is a violet-black powder which dissolves in water to give a violet and in concentrated sulphuric acid to give a brown-violet solution. The dyestuff gives a red-violet colour with chrome-printed cotton. Acid-bath dyed animal fibre is also a red-violet colour which hardly changes in shade on after-chroming.

Similar dyestuffs are obtained when the diazo component mentioned above is replaced by 52.8 parts of 2-amino-benzene-1-phenylsulphonyl-4-sulphonic acid-phenylamide-3'-carboxylic acid-4'-hydroxy-5'-sulphonic acid or 56.3 parts of 2-aminobenzene - 1 - (4'-chlorophenylsulphonyl) - 4-sulphonic acid phenylamide - 3'' - carboxylic acid-4''-hydroxy-5''-sulphonic acid or if the following are used instead of the coupling component given above: 32.9 parts of 2-(4'-tolylamino) - 8-hydroxynaphthalene - 6 - sulphonic acid, 35.0 parts of 2-(4'-chlorophenylamino) - 8 - hydroxynaphthalene-6-sulphonic acid or 34.5 parts of 2-(4' - methoxyphenylamino)-8-hydroxynaphthalene-6-sulphonic acid.

*Example 6*

To 50.8 parts of 2-aminobenzene-1-n.butylsulphonyl - 4 - sulphonic acid-phenylamide-3'-carboxy-4'-hydroxy-5'-sulphonic acid in neutral aqueous solution in 300 parts of water are added 6.9 parts of sodium nitrite dissolved in 100 parts of water. The mixture is added dropwise at 0–3°, with stirring, to 40 parts of concentrated hydrochloric acid and the requisite amount of ice. The majority of the yellow-brown diazonium compound precipitates out. After diazotisation is complete the reaction mixture should be distinctly acid to Congo red and should contain no free nitrous acid. To the diazo suspension is added in the course of an hour at 0–5° a weakly acid solution of 23.9 parts of 2-amino-8-hydroxynaphthalene-6-sulphonic acid in 100 parts of water. After 2–3 hours the acid reaction to Congo red is removed by dropwise addition of sodium acetate solution. Stirring is continued for 16 hours at 20°. Next 40 parts of concentrated hydrochloric acid and 10% of common salt are added and the dyestuff which separates is filtered off and dried. The dried dyestuff is a dark reddish violet powder giving a blue-red solution in water and a dark brown one in concentrated sulphuric acid. It dyes chrome-printed cotton in bluish red shades. The acid-dyeing on wool is also bluish red and hardly alters in shade on after-chroming.

Similar dyestuffs are obtained if the above mentioned diazo component is replaced by 42.8 parts of 2-aminobenzene-1-n.butylsulphonyl-4-sulphonic acid phenylamide-4'-hydroxy-3'-carboxylic acid, 40 parts of 2-aminobenzene-1-ethylsulphonyl-4-sulphonic acid-phenylamide-4'-hydroxy-3'-carboxylic acid, 38.6 parts of 2-aminobenzene - 1 - methylsulphonyl-4-sulphonic acid-phenylamide-4'-hydroxy-3'-carboxylic acid or by replacing the above coupling component by 31.9 parts of 2-amino-8-hydroxynaphthalene-3:6-disulphonic acid, 25.3 parts of 2-methylamino-8-hydroxynaphthalene-6-sulphonic acid. 31.5 parts of 2-phenylamino-8-hydroxynaphthalene-6-sulphonic acid gives somewhat more bluish deystuffs.

What I claim is:

1. A monoazo dyestuff corresponding to the formula

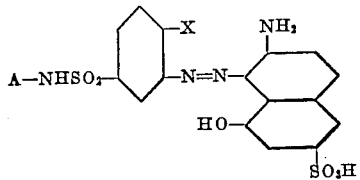

wherein
A represents a radical of the benzene series containing an o-hydroxy-carboxy grouping,
X represents a member selected from the group consisting of SO₃H, a lower alkyl sulphonyl radical and an aryl sulphonyl radical of the benzene series, X being directly linked to the adjacent benzene ring by the SO₂-group thereof.

2. A monoazo dyestuff corresponding to the formula

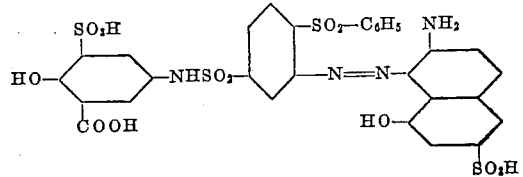

3. A monoazo dyestuff corresponding to the formula

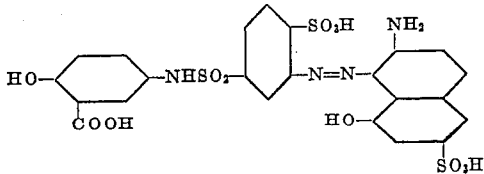

4. A monoazo dyestuff corresponding to the formula

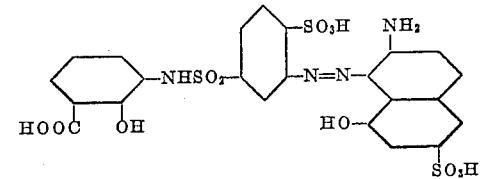

5. A monoazo dyestuff corresponding to the formula

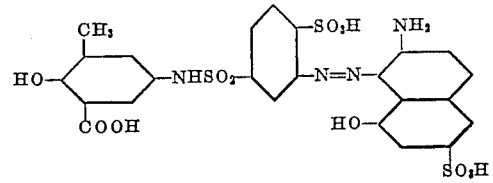

WERNER KUSTER.

REFERENCES CITED

The following references are of record in the file of this patent:

UNITED STATES PATENTS

| Number | Name | Date |
|---|---|---|
| 1,901,515 | Hentrich et al. | Mar. 14, 1933 |
| 2,077,854 | Richard | Apr. 20, 1937 |
| 2,152,007 | Winkerler et al. | Mar. 28, 1939 |
| 2,449,130 | Krebser et al. | Sept. 14, 1948 |

FOREIGN PATENTS

| Number | Country | Date |
|---|---|---|
| 126,460 | Great Britain | May 9, 1919 |